US006865285B1

(12) United States Patent
Villa-Aleman

(10) Patent No.: US 6,865,285 B1
(45) Date of Patent: Mar. 8, 2005

(54) LED INTENSE HEADBAND LIGHT SOURCE FOR FINGERPRINT ANALYSIS

(75) Inventor: Eliel Villa-Aleman, Aiken, SC (US)

(73) Assignee: Westinghouse Savannah River Company

( * ) Notice: Subject to any disclaimer, the term of this patent is extended or adjusted under 35 U.S.C. 154(b) by 0 days.

(21) Appl. No.: 09/578,662

(22) Filed: May 25, 2000

(51) Int. Cl.[7] ............................ G06K 9/00; F21V 21/08
(52) U.S. Cl. ..................................... 382/124; 362/103
(58) Field of Search ................................ 382/124, 125; 362/103, 105, 108, 230, 555, 106, 58; 436/71, 164

(56) References Cited

U.S. PATENT DOCUMENTS

| 2,539,104 A | | 1/1951 | Rodel ........................... 128/22 |
|---|---|---|---|
| 4,983,846 A | | 1/1991 | Rios et al. |
| 5,099,131 A | | 3/1992 | Brownrigg et al. ...... 250/458.1 |
| 5,187,748 A | | 2/1993 | Lee ................................ 382/4 |
| 5,210,588 A | | 5/1993 | Lee .............................. 356/71 |
| 5,467,403 A | | 11/1995 | Fishbine et al. ............. 382/116 |
| 5,558,428 A | * | 9/1996 | Lehrer et al. ................ 362/105 |
| 5,687,004 A | | 11/1997 | Chen .......................... 358/445 |
| 5,822,445 A | | 10/1998 | Wong .......................... 382/127 |
| 6,485,981 B1 | * | 11/2002 | Fernandez .................... 436/71 |

OTHER PUBLICATIONS

Haddock, "SRS shows investigation tools," The Augusta Chronicle, Apr. 30, 1999, pp. 1–2.*
HDS Systems, Inc.: *The Action Light™ Family*, pp. 3–4, copyright HDS Systems, Inc. 1998–2000 (updated Jul. 2000; printed Feb. 11, 2002).
HDS Systems, Inc.: *The Action Light™ Technologies*, pp. 6, 8–9, 11, copyright HDS Systems, Inc. 1998–2001 (updated Oct. 2001; printed Feb. 11, 2002).
HDS Systems, Inc.: *The Birth of a New Lamp System*, pp. 3–4, copyright HDS Systems, Inc. 1998–1999 (updated Oct. 1999; printed Feb. 11, 2002).

* cited by examiner

Primary Examiner—Mehrdad Dastouri
Assistant Examiner—Virginia Kibler
(74) Attorney, Agent, or Firm—McNair Law Firm, P.A.

(57) ABSTRACT

A portable, lightweight and high-intensity light source for detecting and analyzing fingerprints during field investigation. On-site field analysis requires long hours of mobile analysis. In one embodiment, the present invention comprises a plurality of light emitting diodes; a power source; and a personal attachment means; wherein the light emitting diodes are powered by the power source, and wherein the power source and the light emitting diodes are attached to the personal attachment means to produce a personal light source for on-site analysis of latent fingerprints. The present invention is available for other applications as well.

9 Claims, 5 Drawing Sheets

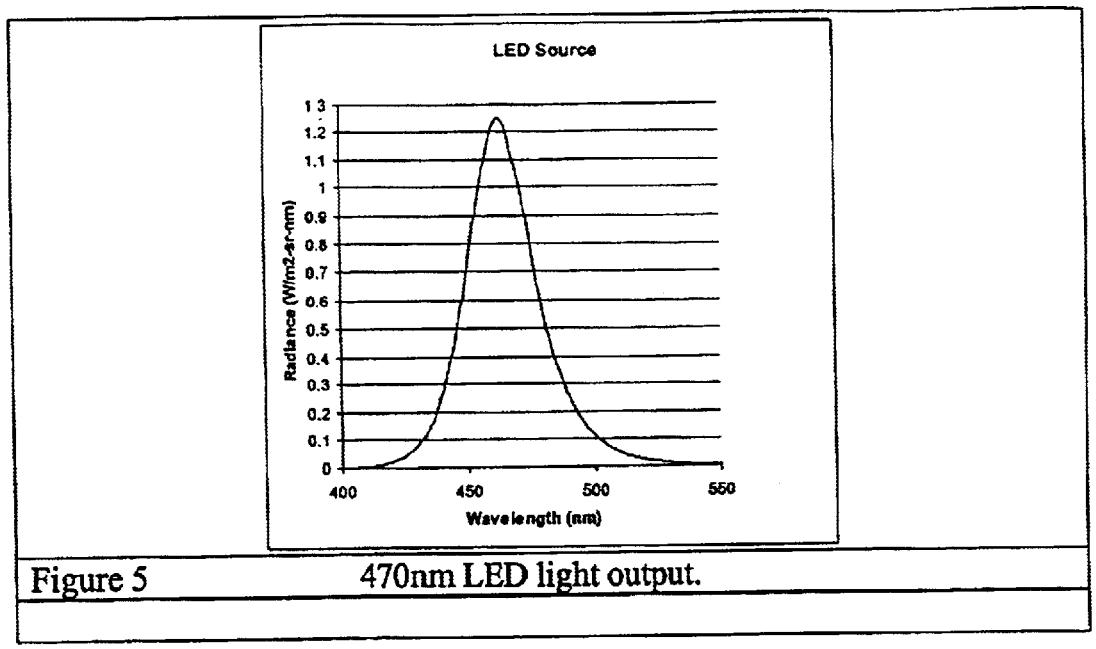
Figure 5 470nm LED light output.

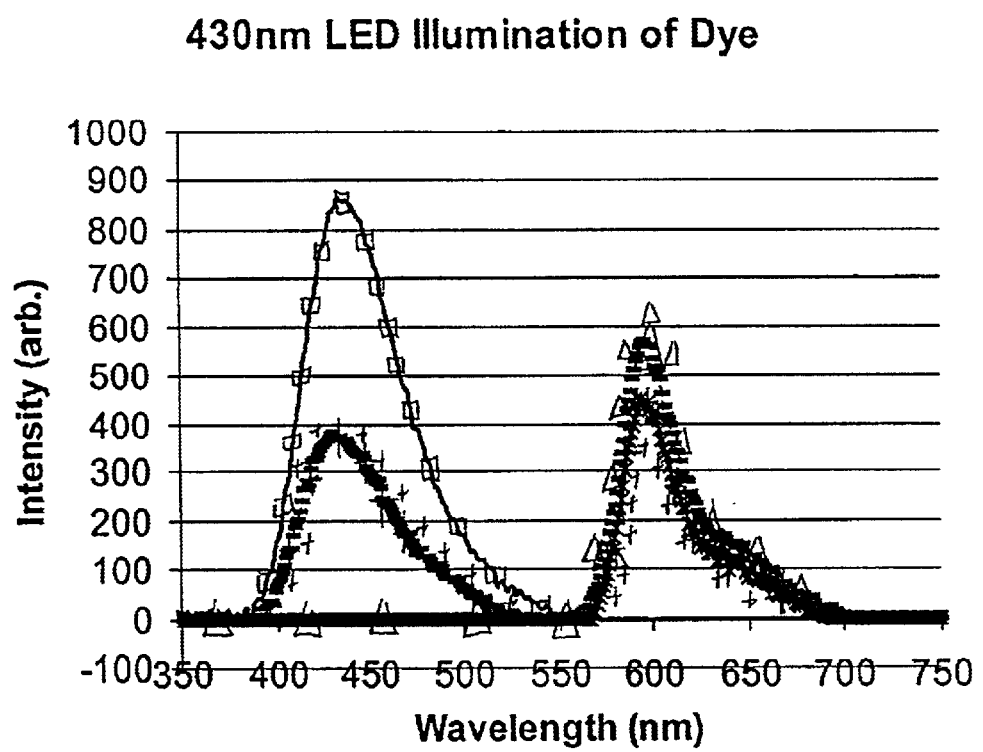
Figure 6     Comparative reflective 430nm LED light output

LED INTENSE HEADBAND LIGHT SOURCE FOR FINGERPRINT ANALYSIS

This invention was made with Government support under Contract No. DE-A09-96-SR18500 awarded by the United States Department of Energy. The Government has certain rights in the invention.

BACKGROUND OF THE INVENTION

Field of the Invention

The present invention relates to devices for detecting and analyzing fingerprints, and more particularly, the device of the present invention relates to a light source for on-site investigatory fingerprint detection and analysis.

Fingerprint acquisition by law enforcement personnel in the field can be a slow process when timeliness in suspect apprehension is imperative. The current method of acquiring and identifying latent fingerprints is to "dust" an area where they are believed to have been recorded. An officer then carefully uses tape to lift the print for transport to a laboratory. In the laboratory the prints are compared with known prints on file or are sent to a central lab for further processing and identification. Before comparing it with other prints, however, the print first must be detected and the time required to cover crime scenes may be prolonged, especially for larger areas of investigation having many surfaces. Therefore, because of the time required to detect prints, a suspect may not be apprehended.

Accordingly, it would be an advance in the art to have a system that provides for rapid latent fingerprint detection and analysis of fingerprints that may be employed in the field.

DESCRIPTION OF RELATED ART INCLUDING INFORMATION DISCLOSED UNDER 37 CFR 1.97 AND 37 CFR 1.98

Several light source devices are currently used in the area of on-site fingerprint detection and analysis. For example, the white light produced by a 250 Watt Xenon filament lamp can be filtered to produce a blue light to illuminate field and on-site surface areas that are brushed with rhodamine 6G. Though they produce the requisite high-intensity light, these sources present a number of problems. They are very expensive, costing approximately $10,000. They are cumbersome and heavy, weighing about 20 pounds, and moreover, they require high voltage electrical power in the order of about 115 V of 5 amps of current, most commonly provided by AC wall outlets. As a result, they limit a user's free range of movement. These and other aspects of the device, make it and other such devices difficult to use depending on their intended application.

U.S. Pat. No. 5,099,131 discloses a system for detecting a latent fingerprint which comprises an infrared laser light source, a detection means, and the upconversion and detection of infrared radiation. This requires a special infrared, i.e. non-visible light, detection means.

U.S. Pat. No. 2,539,104 discloses a forehead lamp particularly suited for medical purposes.

U.S. Pat. No. 5,822,445 discloses a prism having a face which receives fingerprints thereon and an LED light source for transmitting light thereto. Although satisfactory in some respects, there are significant disadvantages associated with this device. The device requires that the person to whom fingerprints belong be present to imprint their fingerprints onto the prism, a rare commodity in cases of criminal investigation. As such, the device is not suitable for on-site latent fingerprint detection and analysis. Moreover, this references teaches a preferable wavelength of 700–800 nm, i.e. a red light source. Plus to be operable, light from the light source therein described must radiate through such a translucent fingerprint receiving surface.

U.S. Pat. No. 5,210,588 discloses a high intensity LED. This device also requires that the person to whom fingerprints belong be present to imprint their fingerprints onto the prism. As such, the device is not suitable for on-site latent fingerprint detection and analysis. To be operable, light from the light source therein described must radiate through a translucent fingerprint receiving surface.

U.S. Pat. No. 5,187,748 discloses a fingerprint identification system comprising a prism having a face which receives fingerprints thereon. Like the two references above, this device requires that the person to whom fingerprints belong be present to imprint their fingerprints onto the prism. Thus, the device is not suitable for on-site analysis or investigation of latent fingerprints left by unknown parties. In addition, to be operable, light from the light source therein described must radiate through a translucent fingerprint receiving surface.

U.S. Pat. No. 5,687,004 discloses an apparatus for the image processing of collected fingerprints. It is not suitable for field analysis, especially for latent fingerprints of unknown parties.

U.S. Pat. No. 5,467,403 discloses a portable optical scanner and recorder of fingerprints for the field collection and remote transmission thereof. As such, it serves to identify persons who are in custody or otherwise present. It does not provide, however, for the collection of latent fingerprints left by unknown parties. Clearly, there is room for improvement in the art.

BRIEF SUMMARY OF THE INVENTION

It is an object of the present invention, therefore, to provide a high intensity wavelength-specific light source for on-site fingerprint detection and analysis.

It is a further object of the present invention to provide a light source for fingerprint detection and analysis which is small and light enough for field use during on-site investigation, and which need not be hand held.

It is a further object of the present invention to provide a light source for on-site fingerprint detection and analysis which allows freedom of movement during use.

It is a further object of the present invention to provide a light source for fingerprint detection and analysis of sufficient intensity so as to cause a dye to fluoresce and thus provide a signal which may be detected by the human eye.

These and other objects may be attained in one aspect of the present invention in a portable, lightweight and high intensity light source for detecting and analyzing fingerprints during field and on-site investigation. Such device comprises an array of light emitting diodes;

and a power source; wherein the light emitting diodes are powered by the power source, and wherein the array emits wavelength-specific light of sufficient intensity to cause a dye to visibly fluoresce to produce a personal light source for on-site analysis of latent fingerprints and other markings.

These and other objects may be attained in a second aspect of the present invention in a portable, lightweight and high intensity light source for detecting and analyzing fingerprints, footprints or other latent markings. Such device comprises at least one light emitting diode; a power source; and a personal attachment device; wherein the light emitting diode is powered by the power source, and wherein the power source and the light emitting diodes are attached to the personal attachment device to produce a personal light source for on-site analysis of latent fingerprints, footprints or other markings.

BRIEF DESCRIPTION OF THE FIGURES

FIG. 5 is a graph showing radiance of 470 nm light output from a light source in accordance with the present invention.

FIG. 6 is a graph showing comparative reflection intensity of 430 nm light output from a light source in accordance with the present invention.

DESCRIPTION OF THE PREFERRED EMBODIMENTS

Figure 1:
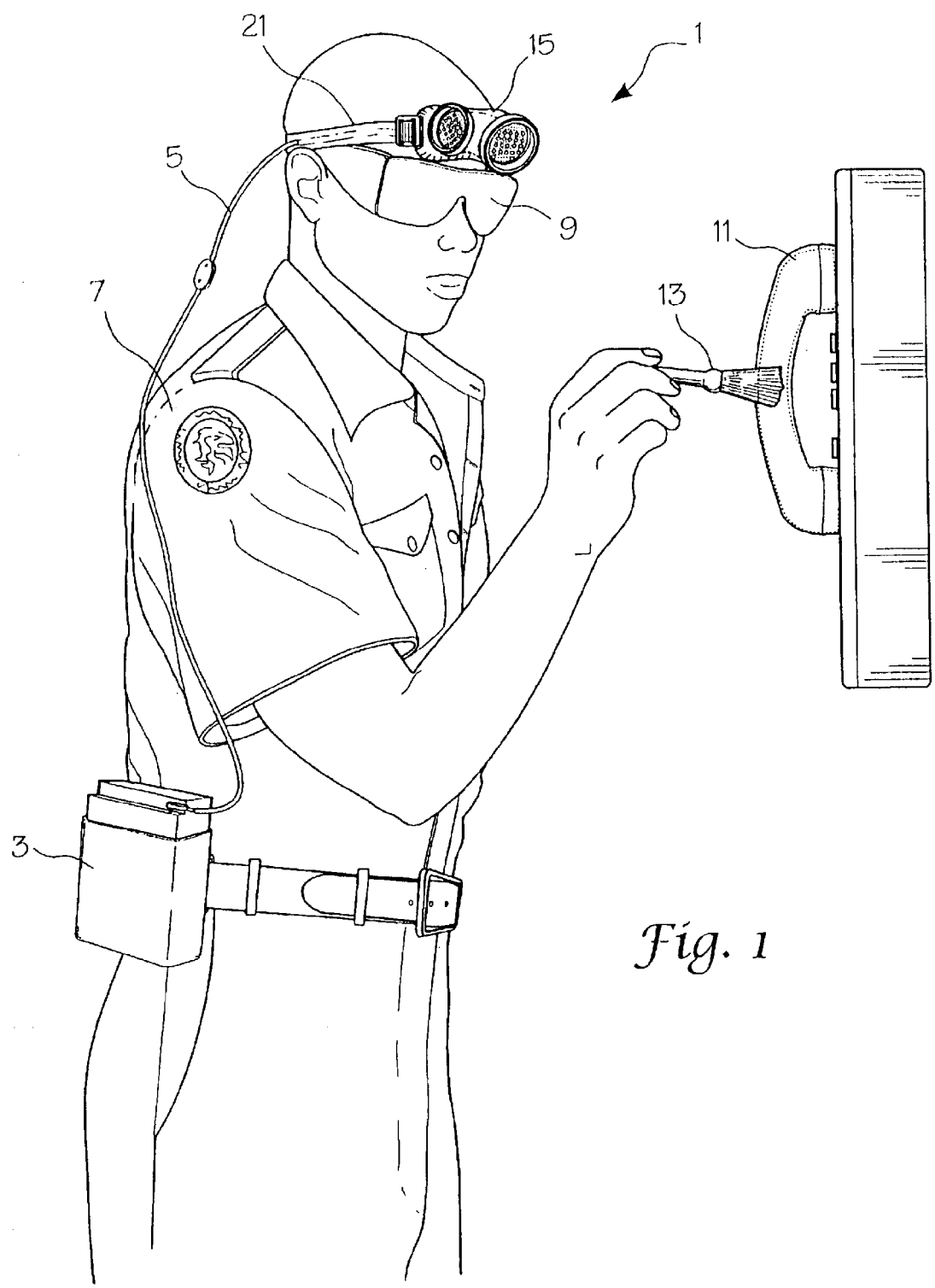
FIG. 1 illustrates an officer wearing a light source in accordance with the present invention and glasses.

The present invention provides a high-intensity light-source that is portable, light-weight, and especially useful for the on-site detection and analysis of fingerprints. This source fulfills a long-felt need in the field of investigatory fingerprint analysis. Law enforcement officials, private investigators and others must frequently search for latent fingerprints. Current light sources include 20 pound Xenon filament lamps connected to an AC wall outlet. These emit white light which is filtered to produce wavelength-specific blue light for the detection of fingerprints. They also cost between $5,000 and $10,000.

To detect latent fingerprints and markings, a detective, officer or other user applies a fluorescing dye such as rhodamine 6G to various surface areas where prints are likely to be found. Upon application, the dye selectively attaches to lipids left behind in the fingerprints, but not to the surrounding "dusted" surface area. When exposed to wavelength-specific light, these dyes fluoresce to produce visible light of another particular wavelength which the user can visibly detect through the use of colored lenses.

The resulting fluorescing light which designates the location of the prints is visible only when using a light source of sufficiently high intensity. The fluorescing light also becomes more visible as the intensity of the original light is increased. These two factors require a high intensity light source. This partially explains the considerable weight of conventional Xenon lamps, as well as the need for a AC outlet. Unfortunately, the resulting weight and bulk of these lamps causes them to become cumbersome, especially because such weight requires that they be hand-held. During sessions which may last in excess of 20 hours, therefore, there exists a great need for a high-intensity fingerprint detection and analysis light source that is both sufficiently powerful to produce the requisite high-intensity light, and light enough to allow quick, mobile, and hands-free use.

The device of the present invention meets this need and others by providing at least one light-emitting diode and a power source. In a preferred embodiment, one or more light emitting diodes (LEDs) are attached for example, to a user's forehead by a head set, or alternatively to another part of the user's body by any conventional attachment device such as a belt pouch, waistband, back-pack and the like, pocket, or any other personal carrying mechanism or instrument. The same available variation in available personal attachment devices holds true for the power source, which may be worn on any part of the body or, in an alternative embodiment, carried.

Using such a preferred embodiment of the present invention, once a dye is brushed onto a surface, one or more light emitting diodes then provide high-intensity light which reflects off both particular markings and the general surface area to which such markings are attached. The wavelength-specific light generated by the LEDs also causes the dye to fluoresce at a different wavelength. Thus, light which reflects off of these surfaces and the fluorescing light differ in color so that through the use of filtering lenses, such as orange goggles in the case where rhodamine 6G is used in conjunction with a blue light source, light fluorescing from the dye-covered prints or markings becomes distinguishable from the reflecting light. In other words, with the use of these lenses, wavelength-specific light reflecting off of surfaces not having fingerprints becomes invisible while different colored fluorescing light radiating from dye-covered fingerprints is visible. The lenses may be used in goggles for immediate human optical detection, or alternately in a video camera having such colored lenses. Other optical scanning devices may also be used for this purpose using the light source of the present invention.

As such, the device of the present invention also allows for quicker detection of prints and/or other markings. For example, when using a preferred embodiment of the device of the present invention, a user will direct radiated light from one or more of light emitting diodes onto a particular surface area which potentially has latent fingerprints or other markings attached thereto. At the same time, the user applies dye to these surfaces. As soon as the surface is "dusted" by application of the dye, the presence or absence of fingerprints becomes evident. The result is immediate detection of fingerprints by the user. As such, a preferred embodiment of the present invention eliminates the need for separate dusting and detection steps. Time and labor is saved by eliminating the heretofore sequential ordering of these steps, carried out either by two users, or in a time consuming sequence whereby one user applies dye, places the dye aside, and picks up a traditional high-intensity light source to search for prints. In an alternate embodiment, the light-weight light source may be detached and easily held at arms length to radiate light onto hard-to-reach surfaces. This also shortens the detection process and allows a more thorough investigation.

Because of its light-weight and portability, the light source of the present invention also allows mobile detection and analysis. In a preferred embodiment, the device of the present invention includes a portable DC power source. This in turn affords speedy investigation of many rooms having multiple surface areas as well as a myriad of outdoor field surfaces. Moreover, in a preferred embodiment, the device of the present invention is portable and thus capable of detecting latent fingerprints in any remote or outdoor environment with or without the benefit of sunlight or other sources of lighting.

The use of LEDs additionally allows hands-free use. In a preferred embodiment, a light source of the present invention is small and light enough to be worn or attached to the user. When attached or worn by the user via a personal attachment device, a light source in accordance with the present invention need not be held, to thus allow hands-free use.

In addition, the light source of the present invention is relatively inexpensive. In contrast to current light sources with high intensity which cost between $5,000 and $10,000, it is estimated that a preferred embodiment of the present invention could be sold for under about $300. Although some incandescent light sources are marketed for below $1,000, these are much weaker in blue light intensity, and they are electrically inefficient.

In a preferred embodiment, the light emitting diode or the array of light emitting diodes receive current from the power source through a power source connection. A single LED, an array, or LEDs configured in any geometric manner may be used. Any LED emitting any particular wavelength of visible light may be used. In a preferred embodiment, this light emitting diode, or preferably an array of light emitting diodes, is powered by a DC power source and attached to a personal attachment device to produce an inexpensive personal light source which allows quick, mobile, and hands-free on-site analysis of latent fingerprints, footprints, and other markings.

An array of LEDs increases the intensity of the light source. In a preferred embodiment 20 LEDs are used. In an alternate preferred embodiment for commercial use, the system has between about 40 and 60 LEDs. In another alternate preferred embodiment, it seems that the best compromise for light production to battery charge calls for an array of between about 60 to 80, 470 nm LEDs. It is noted however, that an array of LEDs numbering from about three to well over one-hundred may be used, preferably including arrays having from about 10 to about 100 LEDs.

The wavelength of the LED is chosen according to the dye used during the dusting of latent fingerprints. At least in several cases, the dye absorbs shorter wavelengths of light than that of the corresponding fluorescence. It should be noted that an array of LEDs which emit green wavelength light may be used.

In a preferred embodiment, and as seen in FIG. 1, the device of the present invention comprises a headset 1, a powersource belt pouch 3, and a powersource connection 5. An officer or user 7 wears orange colored goggles 9 while examining a telephone receiver 11 for latent fingerprints. The officer 7 applies dye powder to the surface of telephone receiver 11 with a dye powder application brush 13.

Figure 2:
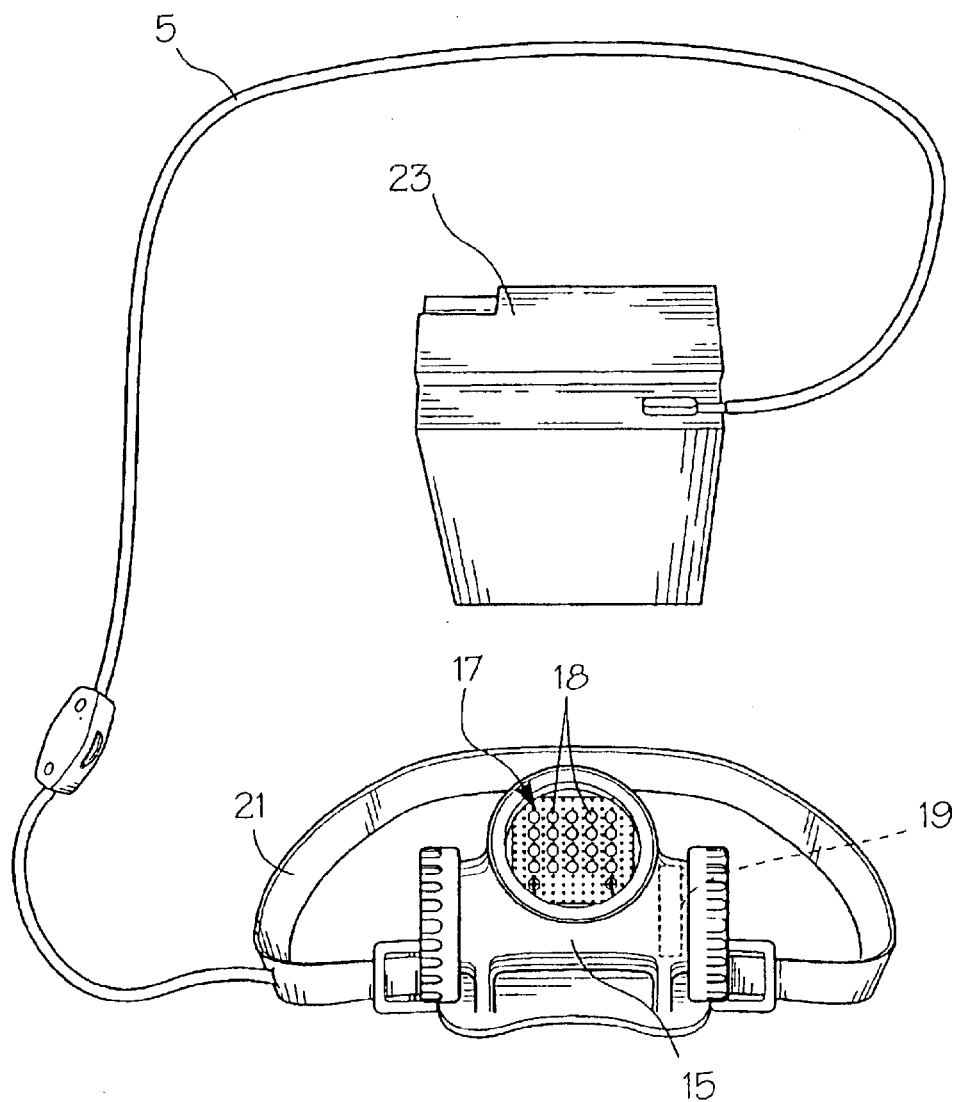
FIG. 2 illustrates the light source and battery pack (belt pouch not shown) from FIG. 1 in accordance with the present invention.

As seen in FIG. 2, the headset 1 comprises a hard plastic housing 15 and a 5×4 array 17 of twenty, 470 nm light emitting diodes (LEDs) 18, an LED cooling fan 19 of approximately one inch in diameter and one and one-half inches in length to maintain the LED's at approximately ambient temperature, and an elastic headband 21. The LEDs 18 used were typical high brightness blue LED (470 nm) manufactured by Panasonic, Inc. and sold by Didi-Key, Inc., having the following ratings, (typical—1500 mcd, minimum—640 mcd, current forward—20 mA, and voltage forward—4.0 volts, typically—3.5 volts).

For control of current, each of the 470 nm LED's 18 is coupled with a 35 ohm resistor. As such, the resistors are used to tailor the available electrical current. The LED's 18 are operated at higher currents in order to increase the luminous output. The large currents available, approximately between 1 to 1.5 amps, produce heating in the LEDs 18 which might normally reduce LED 18 intensity and lifetime. This is solved by use of the fan (not shown).

The power source 12 provides direct current and is preferably a 6-volt battery or a 4 alkaline D-cell battery pack. In an alternate preferable embodiment, a 4 nickel-cadmium D-cell battery pack may be used. The fan 19 is used for cooling because the LEDs 18 are driven at higher than average currents. In this embodiment, the personal attachment means comprises elastic headband 21 and hard plastic housing 15 in the headset 1 as well as power source belt pouch 3 which is shown in FIG. 1.

Figure 3:
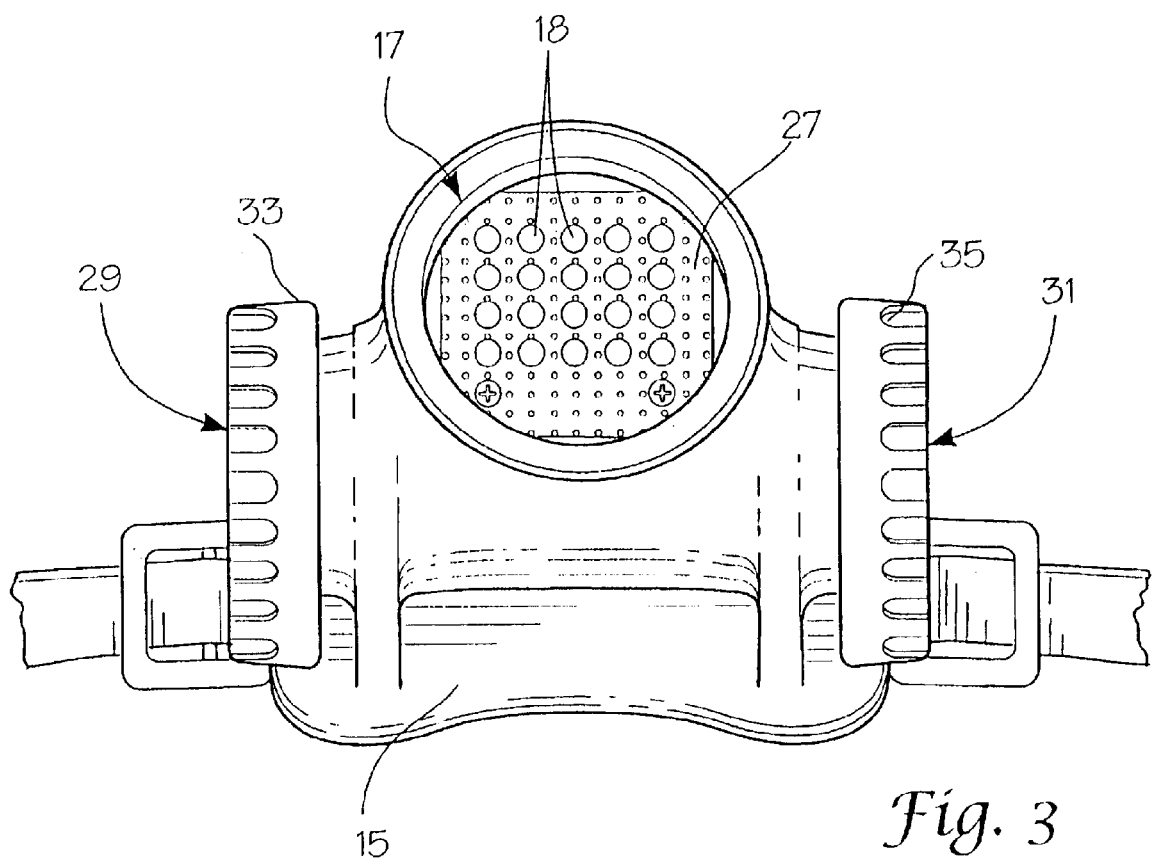
FIG. 3 illustrates a close-up view of the LED array in the light source from FIG. 1 in accordance with the present invention.

FIG. 3 shows a close-up view of hard plastic housing 15 and LED array 17. LED's 18 fit upon an array mounting plate 27. On one side of hard plastic housing 15 is a fan air inlet 29. On the other is a fan air exhaust outlet 31. These are respectively covered by fan air inlet cover 33 and fan air exhaust outlet cover 35.

An LED cooling fan 19 is contained within hard plastic housing 15. It draws air into hard plastic housing 15 through fan air inlet 29, across the backside of LED array mounting plate 27 thereby cooling LED's 18, and out of hard plastic housing 15 via fan air exhaust outlet 31. Both the fan and the high-intensity LED array are powered by power source 23.

Figure 4:
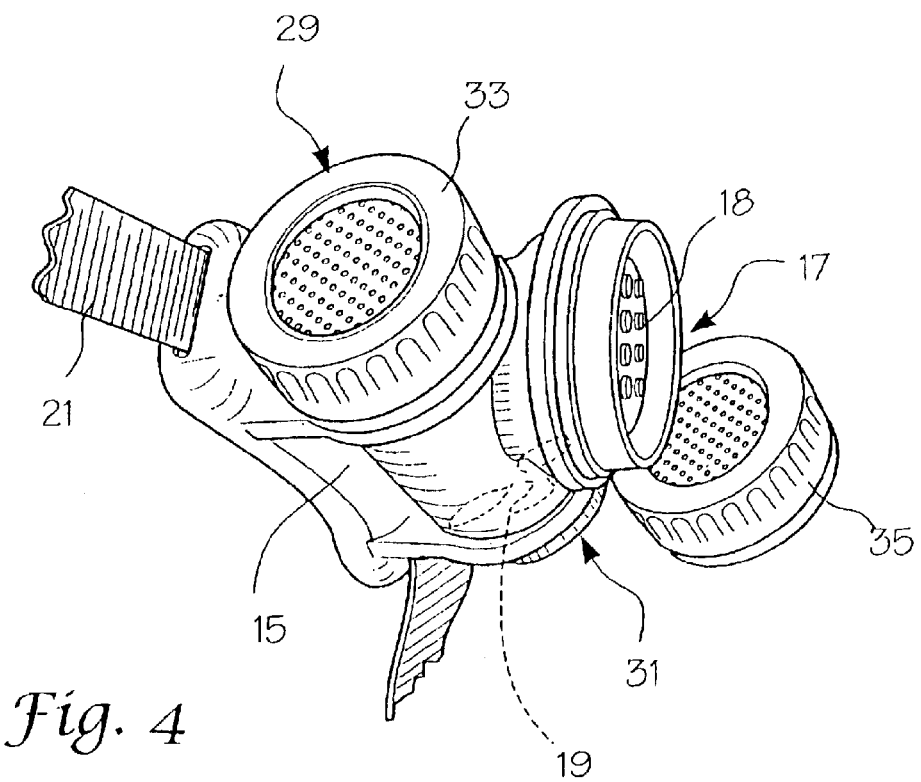
FIG. 4 illustrates a side view of the light source from FIG. 1 in accordance with the present invention showing an air inlet for LED cooling.

FIG. 4 shows a side view of headset 1 showing air inlet 29 with fan air exhaust outlet cover 35 detached.

Referring to FIG. 4, a side view of the light source showing an air inlet fan 29 located inside of the light source housing 15 and which pulls air across the back of the LED array 17 for LED's 18 cooling.

In this embodiment and using a 6-volt power supply, the available voltage is 2 volts. Thus, using 35 ohm resistors provides a substantial current of 57 mA. It has been shown that at this current the LEDs will last at least 1000 hours. In an alternate embodiment, it has been shown that current can be increased to at least 87 mA using 23 ohm resistors.

EXAMPLE 1

Using a 470 nanometer source of 6 LEDs, the spectra of white paper and rhodamine 6G dye on paper, illumination by these LEDs was recorded using a spectroradiometer obtainable from Analytical Systems Device, Incorporated. As seen, the LEDs emit light having a wavelength from between about 400 nm to about 550 nm. The LEDs radiated light onto white paper covered with rhodamine 6G dye. More specifically, the LED was shown onto a Spectralon target held at about one meter away from the light source. It scattered light in all directions (lambertian). The fiber optic of the spectroradiometer was directed to the illuminated portion of the Spectralon target. FIG. 5 plots the resulting reflective light radiance (W/m$^2$-sr-nm) as measured by the above-mentioned spectroradiometer.

EXAMPLE 2

Using an array of six 430 nanometer emitting LED reflective illumination of white paper versus rhodamine 6G dye on the white paper was measured using a spectroradiometer obtainable from Analytical Systems Device, Incorporated. Reflective light radiating from the 430 nanometer LED's and then reflectively radiating off of white paper and the dye produced the three curves shown on FIG. 6. As seen, the LEDs emit light having a wavelength from between about 400 nm to about 550 nm. As also seen, the curve designated by squares show reflection of 430 nanometer illumination off of white paper not having dye attached thereto. The curve designated with plus signs illustrates reflection of 430 nanometer blue illumination and emmited fluorescence light produced by rhodamine 6G dye. The third curve designated by triangles is of the filtered reflected fluorescence from rhodamine 60 dye as viewed through an orange filtering lens. As seen in this third curve, light reflecting off of plain white paper has a zero intensity when viewed through an orange tense. As such, only the longer wavelength light of the dye is strongly visible.

It should be noted that the intensity from the 470 nm emitting LEDs in Example 1 was found to be 15–18 times stronger than that from the 430 nm emitting LEDs in Example 2. Moreover, though output herein described is comparable to blue light filtered from white light sources, a source having an array of 40 to 80 LEDs will easily surpass any blue light filtered from a 300 W Xenon or QTH lamp. In addition, higher efficiency LEDs will enable the use of even smaller light sources.

As seen, the present invention provides at least one light emitting diode; a power source; and a personal attachment device; wherein the light emitting diode is powered by the power source, and wherein the power source and the light emitting diodes are attached to the personal attachment device to produce a personal light source for on-site analysis of latent fingerprints, footprints or other markings.

In accordance with the present invention, therefore, a light-weight, portable and inexpensive, high intensity light source for detecting and analyzing fingerprints, footprints or other latent markings is provided. It is small and light enough for field use during on-site investigation, and need not be hand held. As such, it allows freedom of movement during use. Such device also provides a reflecting signal which can be detected by the human eye. It will be evident to one skilled in the art that other objects are met by the foregoing invention.

It will be understood that various details of the invention may be changed without departing from the scope of the invention. Furthermore, the foregoing section description is for the purpose of illustration only, and not for the purpose of limitation since the invention is defined by the claims.

I claim:

1. A low cost method of on-site analysis of a surface having fingerprints and other indicia thereon comprising the steps of:
  a) providing at least one high intensity blue light emitting diode that will emit light in the wavelength range from about 400 to about 550 nm;
  b) compactly mounting said diode on a personal attachment device that is light-weight and allows the person wearing said device to work hands free and readily view a surface with a wide area;
  c) providing a portable power source for said diode, said source being a battery pack having associated resistor means providing for selection of electric current and voltage, said voltage and current levels being selected to extend diode lifetime;
  d) applying a fluorescing dye to the surface to be investigated, said dye being selected to fluoresce in light emitted in said wavelength range;
  e) maintaining current from said power supply to provide the desired luminous output from said diode for observing a wide area of said surface and for extending the wearing time of said attachment device;
  f) illuminating the surface to which said dye has been applied with light emitted from said light emitting diode; and,
  g) detecting fluorescent light from indicia or fingerprints on said surface by viewing said light through lens in goggles or eyeglasses that transmit the fluorescent light so that it is visible to the human eye allowing said viewing to be performed hands-free while applying said dye or after said dye has been applied.

2. The method of claim 1 wherein multiple diodes are provided and including the step of cooling said diodes to extend observation time and diode lifetime.

3. The method of claim 1 including the step of cooling said diode wherein said cooling is performed by a portable fan associated with the personal attachment device.

4. The method of claim 3 wherein the personal attachment device comprises head gear.

5. A compact, light-weight, low cost light source and associated apparatus for detecting and analyzing fingerprints or other indicia on a surface to which a selected fluorescing dye is applied comprising:
  a) at least one high efficiency, high brightness, light emitting diode, said diode being selected to emit and project light for a sustained period onto a wide area of a surface in a wavelength range from about 400 nm to about 550 nm wherein the light emitted will cause said dye to fluoresce and transmit detectable light to reveal the presence of fingerprints or other indicia on the surface to which dye is applied;
  b) a portable attachment device for mounting said light emitting diode on a person, said device being light weight, compact, and attachable to a person in a manner to provide hands free use of said light source whereby light emitted from said one diode may be directed to the surface area to which dye is applied during the application of dye and/or immediately thereafter;
  c) a portable power source for said light emitting diode, said power source including a battery pack having associated resistor means for selecting and maintaining the current and voltage at a level that extends diode lifetime for wide area viewing; and,
  d) goggle or eyeglass means having a viewing lens that transmits fluorescent light so that it is visible to the human eye whereby the viewing of a surface can be performed hands free while applying dye to a surface or thereafter.

6. The light source of claim 5 including an array comprising 2 to 100 light emitting diodes.

7. The light source of claim 6 wherein said personal attachment device is a head set means and includes means for cooling said diodes to increase diode lifetime.

8. The light source of claim 7 wherein said cooling means includes a fan.

9. The light source of claim 5 wherein said at least one diode has been selected to emit light at a wavelength that produces light in the range from 400 nm to 550 nm that will cause dyes selected from the group consisting of rhodamine 6G dye and fluorescent dyes to visibly fluoresce and be seen through eyeglasses or goggles with green, orange, or red filters.

* * * * *